Dec. 22, 1959   H. Z. TABOR   2,917,817
RECEIVER FOR SOLAR ENERGY COLLECTORS
Filed Jan. 17, 1956
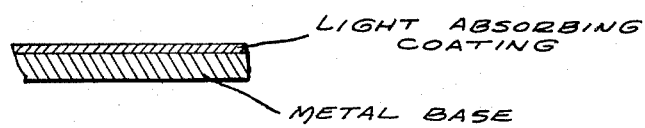
INVENTOR
HARRY ZVI TABOR
BY
ATTORNEY United States Patent Office 2,917,817
Patented Dec. 22, 1959

2,917,817
RECEIVER FOR SOLAR ENERGY COLLECTORS

Harry Zvi Tabor, Jerusalem, Israel, assignor to The Research Council of Israel (Hamoetza Hamadait), Jerusalem, Israel, a department of the Government of Israel Application January 17, 1956, Serial No. 561,696

Claims priority, application Israel March 25, 1955

6 Claims. (Cl. 29—180)

This invention relates to solar radiation collectors, alternatively termed solar heaters, that is, installations or apparatus designed to receive solar radiation and to make available for use a part of the energy thus received by converting it into utilizable heat. More particularly the invention is concerned with those parts of solar heaters on which the solar radiation falls or is concentrated by optical means and which will, for the sake of simplicity, be referred to hereinafter as "receiver."

Solar radiation reaching the surface of the earth is mainly concentrated in the visible spectrum and does not exceed a wavelength of about 2 microns. In the following, the terms "light" or "visible light" will also be used as an equivalent of the term "solar radiation," and they are meant also to include the invisible part of the solar radiation of larger wavelength than the visible spectrum. In order to be a good receiver, a surface exposed to solar radiation must be as little light-reflecting and as little transparent to light as possible, that is, as dark as possible, and preferably black. In fact, the receivers of many known solar heaters are blackened. However, the darker a body, the more heat it radiates with increasing temperature, the heat radiation having wave lengths mainly above 2 microns. Therefore, the better the receiver is adapted to absorb solar radiation, the greater are the energy losses by heat radiation, with the result that it has not been possible so far to obtain from solar heaters utilizable energy at high temperature except by the use of optical systems of high concentration power.

The invention has the object to provide receivers for solar heaters, which are adapted to absorb a high proportion of the impinging solar radiation and to convert it into utilizable energy at high temperature with comparatively small losses of heat by re-radiation.

The drawing illustrates a general embodiment of the solar receiver.

The invention consists in a receiver for solar heaters, being a composite body comprising a metal base and a thin coating applied to the base in heat-conducting relation, the physical properties of the base and coating in their behaviour to light and heat being so selected that the coating is substantially not heat-absorbing, substantially no heat is radiated from the base through the coating, and the receiver as a whole is light-absorbing and substantially not heat-emissive.

In one embodiment of the invention, the receiver may have a very thin dark metal surface layer on a bright metal base. The surface layer is transparent to heat radiation and therefore does not, or not appreciably, increase the low heat-emissivity of the bright metal base, but its dark color provides a good absorption for the solar radiation, converting it into heat which is transmitted to the base by conduction.

A receiver of this kind can be produced, for example, by the electrolytic deposition of the dark surface metal layer on the bright metal base.

The optical properties of the surface layer with respect to heat radiation and light radiation depends on several controllable factors, e.g. the thickness of the surface layer, the material of the surface layer, and the texture of the deposit forming the surface layer. That the properties of thin metal layers can thus be varied is a known fact. For example, it is known that very thin gold deposits as formed by evaporation, can be good reflectors of heat radiation and at the same time poor reflectors of light. By changing the conditions the thin gold layers may be such as to constitute poor reflectors of both heat radiation and visible light. Finally, gold can be deposited in a very thin layer as a black smoke in the presence of tungsten oxide, so as to be transparent to heat radiation but light-absorbing.

The heat generated by the receiver from solar radiation may be utilized in any suitable manner. For example, the receiver may be disposed so as to give off the heat to water for heating it or for generating steam. Or the heat may be used for carrying out chemical reactions or for similar purposes. Current may be produced thermo-electrically. In all these cases, and for numerous other purposes as well, it is a great advantage of the receiver according to the invention that temperatures of up to about 300° C. can be reached with an optical system of lower concentrating power than would be necessary with conventional black receivers.

Composite receivers according to the invention can be manufactured in many different ways. Some of them are described in the following examples to which the invention is not limited.

*Example 1*

The base of the receiver is a body having a very bright nickel surfaces. This is immersed, as a cathode, into an aqueous electrolytical bath containing per liter:

75 gms. of nickel sulfate
28 gms. of zinc sulfate
24 gms. of ammonium sulfate
17 gms. of ammonium thiocyanate
2 gms. of citric acid The pH of this solution is about 4. The anode is pure nickel. The electrolysis is carried on for 2–4 minutes with a current density of 2 milliamperes/cm.$^2$ at a bath temperature of about 30° C. A wide tolerance is possible in the conditions of the electroplating, but if the current density is increased, the time of plating should correspondingly be reduced. The deposit produced under the conditions stated above appears black and is a good absorber of solar radiation, whereas the emissivity of the receiver as a whole is quite low, being of the order of 0.11, taking the emissivity of an ideal black body as unity.

If silver is used instead of nickel as a base, a receiver with an emissivity as low as 0.05 may be obtained.

*Example 2*

An aluminum base is first covered with an oxide layer by anodizing. For this purpose the aluminum body is immersed as cathode in an aqueous solution containing 3% by volume of sulfuric acid and 3% by volume of phosphoric acid, with carbon as an anode. An electric current of 6 milliamperes/cm.$^2$ is passed during 20 to 30 seconds through the solution, then the current is reversed for a few seconds to give partial anodizing. After rinsing, the aluminum body is immersed for 15 minutes at 85–90° C. in an aqueous solution containing per liter:

25 gms. of copper nitrate $Cu(NO_3)_2.6H_2O$
3 gms. of concentrated nitric acid
15 gms. of potassium permanganate After this treatment, the aluminum body is withdrawn, dried and heated to about 450° C. for some hours, until the surface color has become almost black. The emissivity measured at ambient temperature of one such body was found to be about 0.12, and was unaffected by subsequent heating.

As an alternative to the blackening by means of a copper salt solution, the oxidized surface may be blackened with suitable dyestuffs or pigments which are absorbed by the surface.

Where it is not convenient to make the receiver entirely of aluminum or aluminum alloy, steel may be used which has been coated with a layer of aluminum.

*Example 3*

A base made from or plated with silver is anodized by immersing it into a 1% silver nitrate solution, with carbon as a cathode, and passing for 30 seconds a current of a density of 25 milliamperes/cm.$^2$. The anodized silver body is immersed for two minutes at room temperature into a solution containing 25 gms./liter of potassium permanganate and 2 gms./liter of sodium hydroxide. A dark surface is produced which is stabilized by heating the body to 200° C. The emissivity of one such body was found to be about 0.06 though the surface appeared quite dark. Silver alloys, such as those containing the usual copper additions, are superior to electrolytically pure silver in that they are stable to higher temperatures. Thus, commercial silver which contains 90% of silver and 10% of copper and other elements gives quite satisfactory results.

Similar results are obtained by the same process if the silver body is replaced by a body of copper, which is preferably alloyed, e.g., with silicon, aluminum and/or nickel in order to make its surfaces stable against heating.

*Example 4*

A body of commercial silver with clean, bright surface is immersed in an aqueous solution of silver nitrate of 1% by weight strength, and an electric current of 3–5 milliamperes/cm.$^2$ is passed through the solution, the silver body being the anode, and the cathode being carbon. This treatment is continued for five minutes at room temperature, whereafter the silver is found to be dark, yet the emissivity measured on one sample was about 0.1. The surface is unaffected by heating up to 400° C.

*Example 5*

Polished stainless steel containing 18% of Cr and 8% of Ni is heated for a few minutes to about 750° C. whereby it assumes a dark color owing to the formation of oxides. The surface thus formed absorbs 80% of the impinging solar energy whereas its emissivity may be as low as 0.12. Subsequent heating at 400° does not affect the surface.

Having now particularly described and ascertained the nature of my said invention and in what manner the same is to be performed, I declare that what I claim is:

1. A receiver for collectors of solar radiation, said receiver being that part of the collector on which solar radiation impinges and adapted to convert light into utilizable heat, comprising a composite body of low thermal emissivity having a base of a bright metal stable under operating conditions and substantially non-heat radiating and a thin exposed light-absorptive and heat-transparent surface coating on said base in heat-conductive relation thereto, said surface coating absorbing and converting impinging solar radiation into heat which is conducted to said base, said coating being itself substantially non-heat radiating.

2. A receiver as defined in claim 1, wherein the base is bright nickel and the surface coating is black nickel.

3. A receiver as defined in claim 1, wherein the coating is electrolytically deposited.

4. A receiver as defined in claim 1, wherein the coating is a dark metal oxide coating.

5. A receiver as defined in claim 1, wherein the coating is a dyed anodic oxide coating.

6. A receiver as defined in claim 1, wherein the coating is an oxidized layer of the metal base.

References Cited in the file of this patent

UNITED STATES PATENTS

| | | |
|---|---|---|
| 890,895 | Ferz | June 16, 1908 |
| 1,074,219 | Skiff | Sept. 30, 1913 |
| 1,342,894 | Bugbee | June 20, 1920 |
| 1,575,309 | Anderson | Mar. 2, 1926 |
| 1,971,240 | Tosterud | Aug. 21, 1934 |
| 1,975,239 | Ungelenk | Oct. 2, 1934 |
| 2,320,998 | Beebe | June 8, 1943 |
| 2,462,728 | Debs | Feb. 22, 1949 |
| 2,491,837 | Smith-Johannsen | Dec. 20, 1949 |
| 2,559,869 | Gay | July 10, 1951 |
| 2,680,437 | Miller | June 8, 1954 |
| 2,682,593 | Jenny | June 29, 1954 |
| 2,683,113 | Prance et al. | July 6, 1954 |
| 2,697,869 | Kingston | Dec. 28, 1954 |
| 2,739,108 | Quaely | Mar. 20, 1956 |
| 2,764,974 | Gottfried | Oct. 2, 1956 |
| 2,827,425 | McGlasson | Mar. 18, 1958 |